May 19, 1970 — G. L. FRISBIE — 3,512,683
MATERIAL HANDLING CONTROL

Filed March 14, 1968 — 2 Sheets-Sheet 1

INVENTOR
George L. Frisbie

BY Schmidt, Johnson, Hovey, Williams & Bradley
ATTORNEYS.

May 19, 1970  G. L. FRISBIE  3,512,683
MATERIAL HANDLING CONTROL

Filed March 14, 1968

INVENTOR
George L. Frisbie

BY *Schmidt, Johnson, Hovey,*
*Williams & Bradley*
ATTORNEYS.

United States Patent Office 3,512,683
Patented May 19, 1970

3,512,683
MATERIAL HANDLING CONTROL
George L. Frisbie, Gypsum, Kans., assignor to Frisbie Construction Company, Inc., Gypsum, Kans., a corporation of Kansas
Filed Mar. 14, 1968, Ser. No. 713,151
Int. Cl. G01f 11/00
U.S. Cl. 222—267      7 Claims

ABSTRACT OF THE DISCLOSURE

A bin having a plurality of spaced-apart, cylindrical rollers extending thereacross to retard gravitation of particulate material. Control rollers are mounted for swinging toward nad away from the space between the rollers to selectively vary the rate of gravitation of material from the bin. Both sets of rollers are powered to facilitate dispensing of material from the bin.

---

Figure 1:
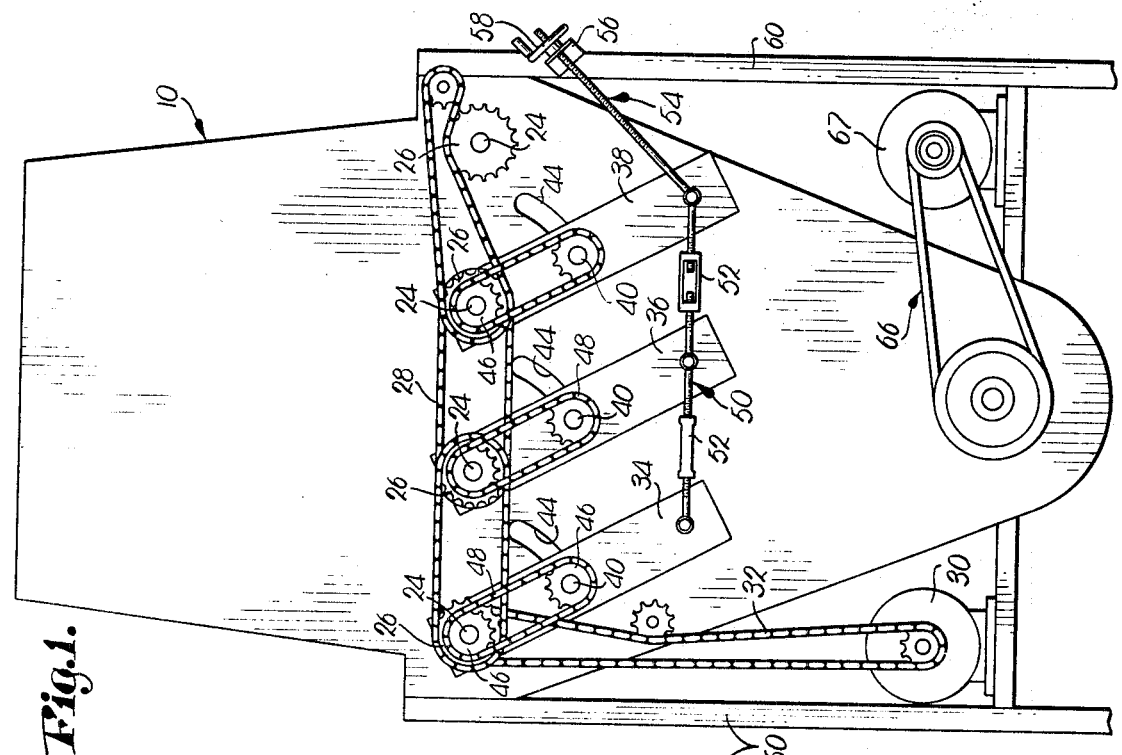

This invention relates to material handling apparatus and, more particularly, to a bin for holding and dispensing particulate material such as grain or the like.

Increased emphasis in animal feeding operations on the efficiency of the ration for producing lean meat has led to innovations in feed preparation. One development which has proven profitable is the processing of whole feed grains such as corn and milo into flakes as a step prior to feeding the ration.

The flaking operation normally includes a step in which the kernels are exposed to live steam or moisture for a period of time sufficsient to soften and otherwise condition or "cook" the kernels. The soft, moist kernels are then passed between rolls where they are mashed into flakes not substantially dissimilar in some respects to cornflakes which are produced for human consumption.

The soft, damp properties of the flakes usually necessitate that they be taken from the rollers by a negative air system where they are deposited in a holding bin to await mixing with other ingredients of the ration. It is essential that the operator of the feed processing and mixing plant have complete control over the flow of the flakes from the holding bin into mixing apparatus. However, the wet, soft, flaky material presents many problems which must be overcome if controlled mixing of the flakes with other ingredients is to be achieved. The soft material tends to bridge across outlet openings instead of gravitating at a uniform rate from the bin. Excessive condensation of moisture within the bin increases the stickiness of the material and further contributes to the bridging problems.

A barrier of spaced-apart, powered rollers across the bin has been used for dispensing hard to handle materials so that a controlled flow of material might be obtained. Rotation of the rollers dispenses some materials through the elongated openings between the rollers in a controllable rate of flow. These "live bottom" bins have been used with flaky material of the kind described, but the results have been disappointing. This material either flows too fast, or bridges the openings to permit little or no flow.

It is, therefore, the primary object of this invention to provide control structure capable of dispensing controlled amounts of a wide range of materials, including flaky material, from a holding bin.

It is another important object of the invention to provide such structure which may be quickly and easily adjusted to accommodate different materials and the varying properties of any given material.

Still a further important object of this invention is the provision of a control structure which is economical to fabricate and easy to operate.

These and other important objects of this invention will be further explained or will be apparent from the description, claims and drawings.

Figure 2:
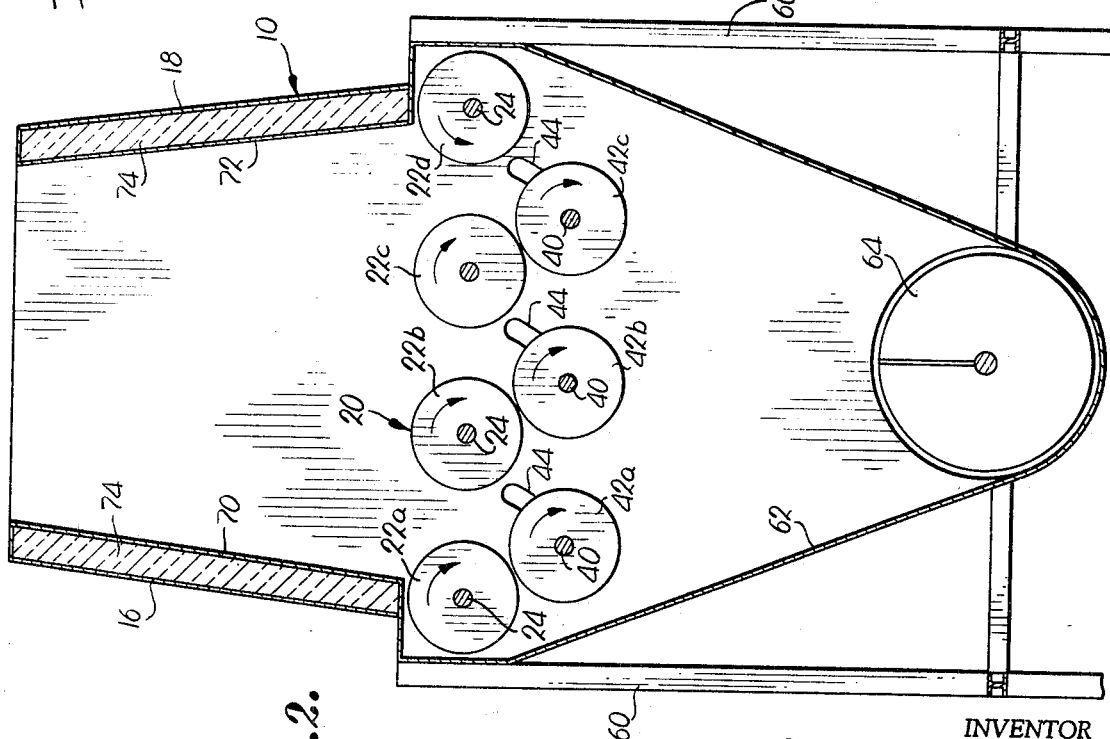
Figure 3:
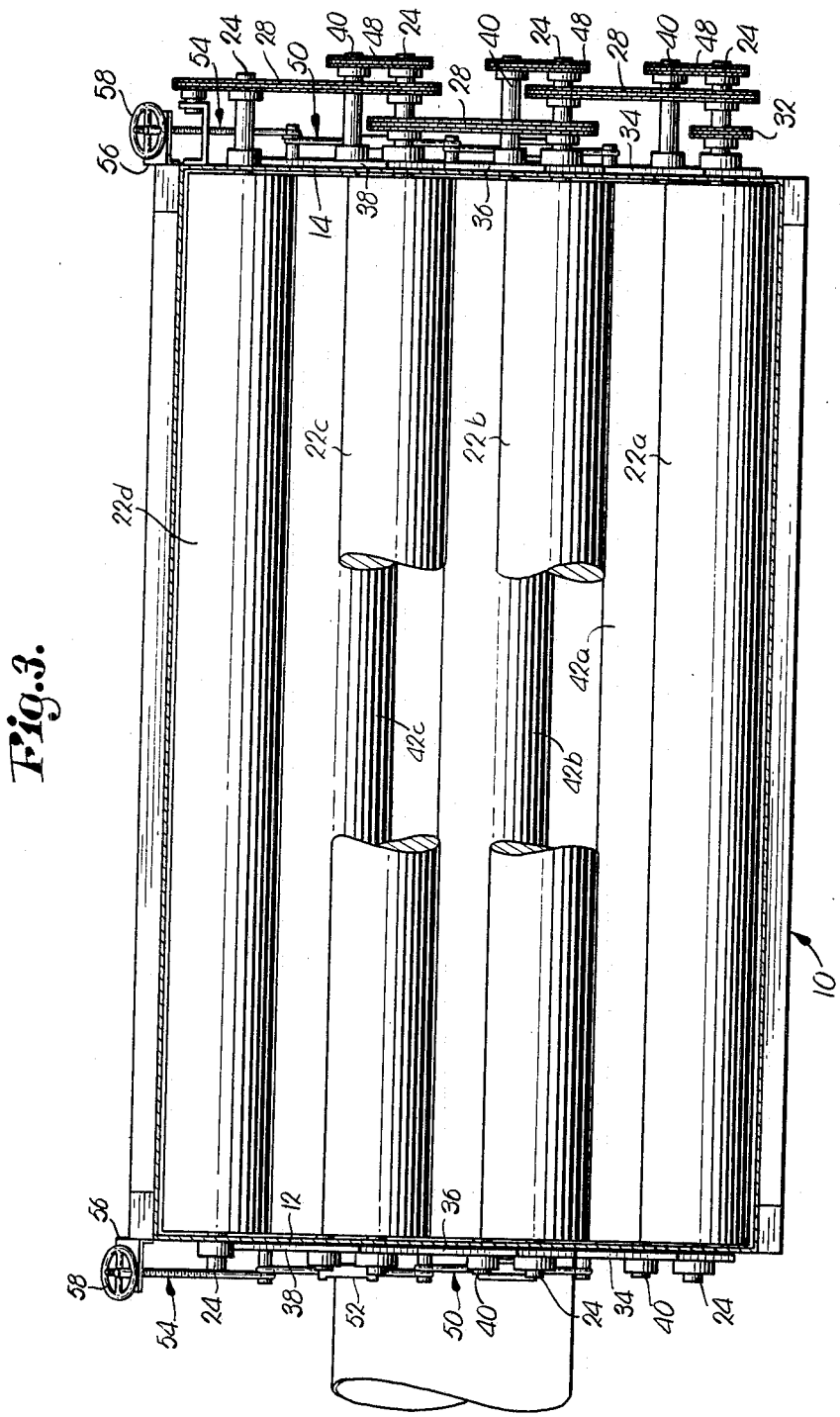

In the drawings:

FIG. 1 ls an end elevational view of a bin provided with a control embodying the principles of the invention;

FIG. 2 is a vertical, cross-sectional view through the bin of FIG. 1, taken between the ends of the rolls and the end wall of the bin; and FIG. 3 is a horizontal, cross-sectional view through the bin, the rolls of the control appearing in plan, parts being broken away to reveal details of construction.

A material holding bin embodying structure pursuant to the principles of this invention is designated broadly in the drawings by the numeral 10 and includes end walls 12 and 14 and sidewalls 16 and 18. FIG. 2 illustrates that sidewalls 16 and 18 are sloped to converge as the uppermost edges of the sidewalls are approached. A horizontally disposed barrier 20 comprised of a plurality of elongated, spaced-apart, cylindrical rollers 22a, 22c and 22d are journalled for rotation by shafts 24 which extend through the end walls 12 and 14. Each of the shafts 24 is provided with sprocket means 26 and the sprockets 26 are interconnected by chain drives 28 as illustrated in FIGS. 1 and 3. The interconnection of the sprockets 26 is such that power applied from motor 30 through a drive 32 to an end shaft 24 imparts rotation to the rollers 22a–22d in the direction of the arrows illustrated in FIG. 2.

The shafts 24 for rollers 22a–22c extend through elongated, rigid plates 34, 36 and 38 respectively. Plates 34–38 are disposed on the outside of bin 10 adjacent end wall 14. The plates 34–38 journal shafts 40 for a plurality of rollers 42a, 42b and 42c. Shafts 40 extend through arcuate slots 44 in the respective end walls 12 and 14. Rollers 42a–42c may be identical in all respects to rollers 22a–22d.

Sprockets 46 on shafts 24 and 40 are interconnected with chain drives 48 as illustrated in FIGS. 1 and 3, whereby each of the rollers 42a–42c is drivingly connected to a corresponding roller 22a–22c, and the rollers 42a–42c are each disposed in predetermined spaced relationship from their corresponding rollers 22a–22c by virtue of the rigid interconnecting plates 34, 36 or 38 respectively. Manifestly, identical plates 34, 36 and 38 intercouple the corresponding shafts 24 and 40 opposite the end wall 12 of bin 10 as illustrated in FIG. 3. Thus, the lower rollers 42a–42c may be swung about the longitudinal axes of their corresponding upper rollers 22a–22c toward and away from a blocking position in the space between adjacent upper rollers 22a–22d. Arms 34–38 insure that the chains 48 remain taut throughout the entire range of swinging movement and also insure that the spacing between the outermost peripheral surfaces of interconnected rollers 22a–22c and lower rollers 42a–42c remains constant.

The lowermost ends of plates 34–38 are interconnected by linkage broadly deisgnated 50, it being understood that the linkage 50 is pivotally connected to each plate 34–38 whereby shifting of one of the plates results in synchronized shifting of the remaining plates. Adjustment means 52 interposed in linkage 50 permits selective variation of the respective angular relationship between the plates as may be desired for providing uniform flow as will be subsequently more fully explained. Adjustment means 54 is pivotally coupled to plate 38 and extends through a bracket 56 whereby manipulation of a handwheel 58 will simultaneously vary the angular disposition of plates 34–38 and consequently shifts the lower rollers 42a–42c toward or away from the blocking relationship between the upper rollers 22a–22d.

Bin 10 may be mounted on vertically extending legs 60. The lowermost portion of bin 10 is offset immediately adjacent barrier 20 as illustrated best in FIG. 2, and the depending walls 62 are tapered inwardly for directing material toward an elongated, helical discharge auger 64 disposed at the bottom of bin 10. Drive means 66 intercouples auger 64 with a motor 67 which is, in turn, provided with suitable controls whereby material gravitating to the bottom of bin 10 may be transferred from the latter by auger 64 through a discharge outlet 68.

In operation, the relatively moist, warm flaky material deposited in bin 10 is retained therein by the spaced-apart rollers 22a–22d which retard gravitation of the material past barrier 20. The spacing between the outermost surfaces of the rollers 22a–22d which is desirable for retarding gravitation of the material through the openings between the rollers will necessarily vary according to the properties of the material in the bin.

The flaky material of the type described requires a relatively steep angle of repose for gravitational movement through barrier 20. The lower or control rollers 42a–42c are disposed immediately beneath and at one side of the paths of travel of the material emanating through the openings defined by the horizontally extending rollers 22a–22d. Thus, the material must travel at an angle to traverse the gravitational path through both the upper and lower sets of rollers. This angular path of travel does not equal the angle of repose for the material and, therefore, the material is retained above barrier 20.

When it is desired to dispense material from bin 10, the operator may simply energize motor 30 which imparts rotational movement to the respective rollers and in the directions illustrated in FIG. 2. The movement of the outer surfaces of the rollers overcomes the angle of repose for the material and transfers the material past barrier 20 for gravitation toward auger 64. The movement of the material past the rotating rollers has a tendency to fluff the flakes so that the same can be handled by auger 64 without undue packing or sticking.

Elimination of sticking or bridging within bin 10 above barrier 20 is accomplished by the angular disposition of sidewalls 16 and 18 whereby the same taper outwardly as barrier 20 is approached. Further, the innermost surfaces 70 and 72 of sidewalls 16 and 18 respectively, may be surfaced with wood paneling or other material for minimizing the tendency of the flakes to stick to the surfaces. A layer of insulation material 74 is preferably installed around bin 10 as illustrated in FIG. 2 to thereby minimize the tendency of the moisture to condense. This further minimizes the tendency for the flakes of material to stick together.

The diameters of the rollers and their speeds and direction of rotation will be determined on the basis of the characteristics of the material to be handled by the bin and control. Since the products may differ, variations in these parameters peculiar to the particular product handled may be expected.

It will be readily understood by those skilled in the art that various modifications of the control of this invention may be carried out without departing from the principles of the invention. For example, it may be desirable to provide automatic means (not shown) for moving the lower control rollers 42a–42c to their blocking positions following each period of rotation of the rollers. Such means could automatically shift the rollers to a predetermined angular position with respect to the upper rollers upon energizing of the power means for rotating the rollers to transfer material from bin 10 toward auger 64.

It should be pointed out that identical linkage 50 and control means 54 are provided at each end of the apparatus. Such construction stabilizes the rollers and insures careful adjustment whereby the rollers may be maintained in precise parallel alignment, and the spacing between adjacent rollers may be carefully controlled to insure uniform flow of material in desired amounts.

Having thus described the invention, what is claimed as new and desired to be secured by Letters Patent is:

1. Apparatus for holding and dispensing particulate material comprising:
   bin means for holding material;
   a barrier across said bin means for retarding gravitation of material therefrom,
   said barrier including a plurality of elongated, spaced-apart, cylindrical roller members presenting elongated openings therebetween,
   means mounting the members for rotation about respective longitudinal axes,
   means operably coupled with the members for rotating the latter; and
   means for controlling the rate of gravitation of material through said openings, said control means including an elongated, cylindrical roller element for each opening respectively, means mounting said elements for rotation about their respective longitudinal axes, means operably coupled with the elements for rotating the latter, and means operably coupled with the elements for selectively shifting the same toward and away from blocking positions across the corresponding openings.

2. The invention of claim 1, wherein the axes of rotation of said members and said elements extend in mutually parallel relationship.

3. The invention of claim 1, wherein said mounting means includes a shiftable elongated, rigid arm carrying each element in predetermined spaced relationship with a corresponding member and below the level of the latter, said shifting means including means coupled with each arm for swinging the respective arms about the axes of their corresponding members through arcs toward and away from the next adjacent members, whereby to vary the blocking of said openings between the members.

4. The invention of claim 3, wherein is provided a linkage interconnecting said arms for insuring that all of said elements are swung in synchronization and as a unit toward and away from the members.

5. The invention of claim 4, wherein is included drive coupling means interconnecting each of said elements with the corresponding one of said members, said rotating means for the members and elements respectively being operable to rotate each element and the corresponding member in the same direction.

6. The invention of claim 1, wherein the rollers of said members are of equal diameter with the rollers of said elements.

7. The invention of claim 1, wherein said rotating means for the members and elements respectively are arranged to rotate said elements at the same speed as said members.

References Cited

UNITED STATES PATENTS 2,688,393  9/1954  Uschmann _____ 222—271 X
3,145,882  8/1964  Quackenbush _____ 222—238 X

FOREIGN PATENTS 76,185  10/1893  Germany.

F. R. HANDREN, Assistant Examiner

ROBERT B. REEVES, Primary Examiner

U.S. Cl. X.R.

222—271